Nov. 1, 1938.  R McC. MOFFAT  2,134,793
PROCESS OF RECOVERING ALUMINA AND POTASH FROM ALUMINOUS ORES
Original Filed Nov. 4, 1932
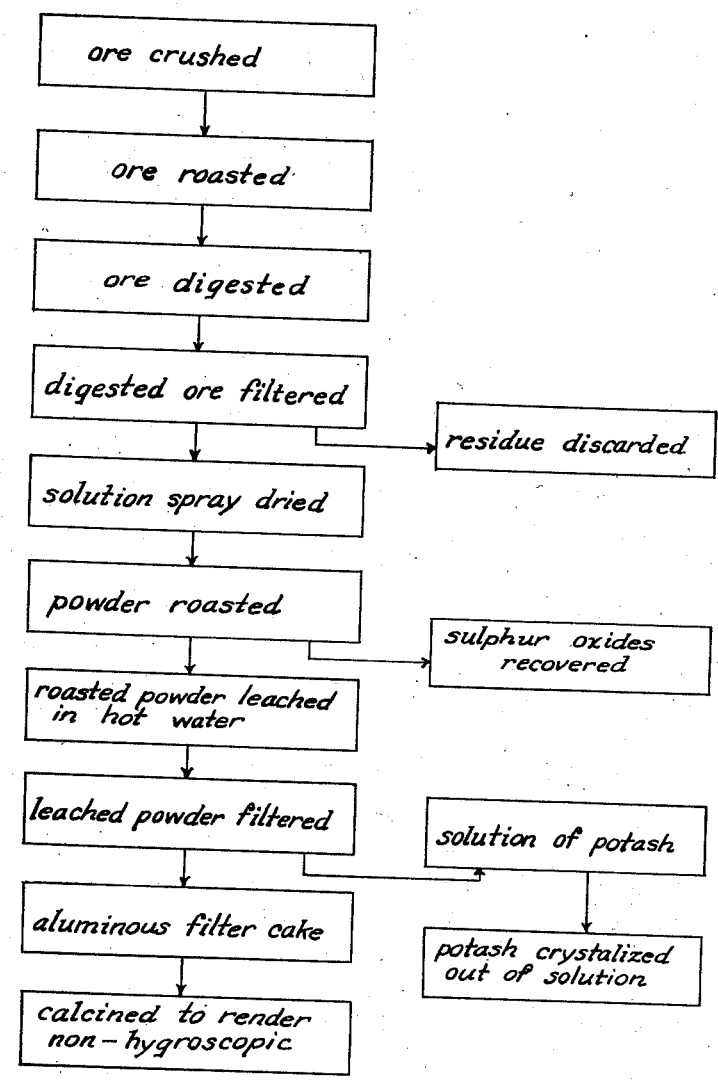

Patented Nov. 1, 1938

2,134,793

UNITED STATES PATENT OFFICE 2,134,793

PROCESS OF RECOVERING ALUMINA AND POTASH FROM ALUMINOUS ORES

Ralph McC. Moffat, Pittsburgh, Pa., assignor to Aluminum, Inc., a corporation of Nevada Application November 4, 1932, Serial No. 641,204
Renewed May 11, 1938

7 Claims. (Cl. 23—141)

This invention concerns a process for treating aluminous ores and particularly to that aluminous ore known as alunite to recover therefrom in substantially pure and uncontaminated condition alumina ($Al_2O_3$) and potash ($K_2SO_4$).

I am aware that many attempts have been made to recover potash, and, less frequently, alumina from aluminous ores in general and from alunite in particular, but such prior attempts always resulted in failure or non-commercial processes. There have been no successful or commercial processes developed other than my own for accomplishing such recovery and as a result an important natural resource of this country is unavailable.

Some attempts to procure the present results have been made by alkaline (e. g. soda) methods but these are either impractical or too costly and result in the loss not only of considerable percentages of the values in the alunite but also of large amounts of expensive chemicals, and furthermore produce products which contain undesirable constituents such as silica, soda, and lime. Some other attempts have been made to procure the present results by means of an acid process but such have been uncommercial and unsuccessful for reasons known in the industry. Among such may be mentioned the impossibility of roasting alum in an ordinary roaster due to the fact that the alum melts and fuses in its own water of crystallization producing a vitreous material which can be removed from the roaster only by heroic methods such as a hammer and chisel and which is a commercially impossible product and procedure. Again, such processes rely upon acid treatments which may go on for days or even weeks without securing complete action or reaction.

A common difficulty resides in the premature rendering of the alumina insoluble by ignition which effectively prevents the successful carrying out of the process. In addition the use of ammonia is highly unsatisfactory nor is silica completely enough eliminated. In general, there has been no properly related or constituted combination of steps which can accomplish the present results and in general the products of such processes are very incomplete as to yield and very impure as to content.

One of the objects of my present invention is to provide a process of a simple and commercial nature which will quickly and easily produce pure alumina and/or pure potash from alunite or other aluminous ore of like nature.

Another object resides in a new combination of steps requiring no expensive chemicals, no prolonged treatments and no difficult procedure.

A further object of my invention resides in an acid treatment for alunite wherein the ore is rapidly broken down, the impurities removed, a novel drying carried out and a simple separation of the ingredients from the dry powder effected.

A still further object resides in spray drying a sulphuric acid solution of the values of the alunite so as to produce a dry powder directly from the solution.

Other and further objects and advantages will either be understood by those skilled in this art or will be apparent or pointed out hereinafter.

The accompanying drawing illustrates a typical flow sheet indicating a practical and commercial process embodying the present invention.

It is known that alunite is substantially a hydrated double sulphate of aluminum and potassium and that enormous quantities of high grade alunite exist in certain western portions of the United States, as in Utah, which may have an average typical alumina content of about 37% and an average typical potash content ($K_2O$ equivalent) of about 11%. This alunite, therefore, represents a valuable natural resource and one which upon proper treatment will yield large quantities of pure alumina and potash, both of which are valuable products of commerce. The alumina can be used as a source from which to make aluminum or various high grade refractories can be made directly from such alumina. The potash is, of course, valuable as a fertilizer and is also used in various industries as is well known. Besides alumina and potash, alunite may contain up to 5%, more or less, of silica, (free) and about 13% water, the $SO_3$ equivalent of the ore being about 38%. Alunite also contains small amounts of iron as oxide. The iron oxide content usually ranges from a mere trace up to 2 or 3%, more or less, depending upon the particular alunite deposit.

I may mine the alunite in any suitable manner forming no part of the present invention and however this ore is taken from the ground it is crushed to suitable mesh, it being understood of course, that any gangue or the like may be removed therefrom if found necessary or desirable, although much of the alunite is to my personal knowledge relatively free from such matter. While, generally speaking, the finer the mesh to which the ore is crushed the more the present process is facilitated or expedited, it is generally unnecessary to crush the ore finer than 20 mesh although in some instances I have crushed it to 40 mesh and even to 60 mesh, all of which consequently fall within the scope of the present invention.

I find it advantageous to crush the ore inasmuch as the ore is next subjected to a roasting operation, that is, the raw ore crushed to suitable mesh is charged into a rotary kiln of any known or approved type and therein subjected to a temperature of approximately 1200° F. for approximately four and one-half hours. It is understood that the fineness of sub-division of the ore makes some variation in the temperature required and in the time necessary to complete the roast. The coarser the ore the longer it takes to roast it and the higher must be the temperature in order to attain a sufficient temperature within the pieces or particles of ore. This is complicated by the fact that in this roast the temperature must not appreciably exceed a hereinafter-mentioned maximum. It is, therefore, apparent that a more uniform roast and also a more satisfactory roast will be secured by sub-dividing the ore to about 20 mesh in fineness. For variations in the particular apparatus and the particular mesh of the ore I find on the whole that the temperature of the roast may vary approximately between a minimum of about 842° F. and a maximum of about 1292° F. (450–700° C.), although I do not intend that I should be limited strictly even to this range as will be understood from the foregoing.

It is clear, however, that the ore must be subjected to a high enough temperature to accomplish the desired functions of the roast, e. g., "demineralization", and the upper maximum temperature is substantially or just under that at which evolution of oxides of sulphur occurs, it being the preferred intent in this particular roast to maintain the temperature as high as possible and yet to avoid any substantial evolution of sulphur oxides. Too high a temperature results in premature ignition, one of the major causes of failure in the prior art. Excessively high temperatures, furthermore, drive off sulphur oxides as elsewhere indicated. This means, therefore, that more sulphuric acid will be required for digesting the ore values and hence represents an uneconomic step. Alunite, as has been stated, consists chemically substantially of a double sulphate of aluminum and potassium and the particular deposits which I have in mind contain in addition only a trace of iron and only a few percent at most of free silica mechanically held in the ore. This roasting step puts the ore into such a condition that its values can thereafter be efficiently and completely digested or extracted.

This digestion will be more fully understood from a reference to my copending application Serial No. 595,039, filed Feb. 25, 1932, and may consist, for example, of the treatment of the raw ore with the suitable or proper amount of sulphuric acid. I find that sulphuric acid of about 50 Baumé is most satisfactory and the ore is digested in this acid for about one and one-half hours at a temperature of about 212–250° F. The amount of acid is roughly 125% by volume of the batch of ore roasted. For example, if I roast one part of ore I would utilize about one and one quarter parts of 50° Baumé $H_2SO_4$, that is, enough acid to completely satisfy the alumina ($Al_2O_3$) content of the batch of ore treated so as to form aluminum sulphate and to satisfy the potash content (as $K_2O$) to form potassium sulphate ($K_2SO_4$), or to ensure that such aluminum and potassium contents remain in sulphate form.

The digestion, as will be understood from my aforesaid copending application, involves the agitation of the ore in the acid for the given time at the given temperature which may be conveniently attained by means of a steam coil. So that the acid will not attack either the digester itself or the steam coil the former may be lined with lead and the latter may either be entirely of lead or lead coated. I am not strictly limited, of course, to digestion for one and one-half hours as this may vary somewhat depending upon the previous conditions such as the fineness of sub-division of the ore and the temperature of the previous roast and, of course, the time of digestion is additionally affected somewhat by the exact strength of the acid which may vary also with the precise temperature of digestion.

After the digestion has been completed, as may be determined by suitable simple tests or observations, which may be, for example, apparent by the solution of the ore in the acid except for the silica which settles to the bottom of the digester, I may add to the digester an amount of water which amounts substantially to six times the calculated $Al_2O_3$ weight in the batch being treated and is added preferably gradually while the solution is still about at the temperature of digestion. This water may be added gradually, as stated, although not necessarily so, as, when it is all added, I continue digestion for about fifteen minutes or until such time as I find I have substantially a clear solution with the silica and any other insolubles settled on the bottom. There may, of course, be some slight suspensions in the solution, but the proper condition can be readily determined by one skilled therewith.

The reaction between the acid and the water also aids in maintaining the temperature. It is to be noted at this point that I might add more or less water than six times the calculated weight of $Al_2O_3$ and I may do this in some instances in order to get the substantially clear solution above mentioned, but the more water that is added the more must be removed later in the process and accordingly I maintain the amount of water at a practical minimum. I may, however, if necessary or desirable add as much water as twelve times the calculated $Al_2O_3$ weight, but in general I need only add about one-half that amount, and may omit this addition of water altogether where such is unnecessary.

While the digested material is still warm I then filter the same or otherwise separate any small amounts of solid or suspended matter from the solution and in general I find that such matter represents not more than about 2 to 3% of the original ore, with the understanding, however, that in some alunites this may run up to about .6% and with others may run as low as ¼% or ½%. While I may otherwise treat the solution to separate it from the solid and suspended matter I preferably filter it through a filter which is maintained at a temperature between about 140° F. and 230° F. A satisfactory filter is preferably one of sufficient capacity to carry out the filtration relatively rapidly. It is desirable that the filter have means for maintaining the solution warm, that is, between approximately 140° F. and 230° F., the preferred range above set forth. A filter press of any suitable type may be utilized but I prefer a continuous filter. A rotary filter may also be used and forms a desirable means for the filtering operation. The solid and suspended matter being mainly silica or siliceous material is effectively separated from the solution proper and may either be discarded or may be used in any desired manner as for making refractories and the like. At the same time crystallization or solidification of the solution is prevented.

The solution is then converted directly to a dry powder. It will be understood from the foregoing that this solution consists substantially of aluminum sulphate and potassium sulphate in sulphuric acid plus any water which was added thereto at the end of the digesting step. I may pass this solution through a spray drier of any known or approved type and size. Such spray drier is per se well known, but has never been used in the present combination insofar as I am aware. While I might use a spray drier wherein the solution is atomized under or by pressure, I preferably use a spray drier having a motor driven whirling disk near the top thereof on which the solution drops or is impinged from a suitably located pipe or pipes and thrown out tangentially falling through a suitable chamber in which a current of hot air is rising.

I find that a very satisfactory temperature for the operation of spray drying my solution is about 190° C. (374° F.), but I may vary this from about 180° C. (356° F.) to about 225° C. (437° F.), more or less. The speed of rotation of the aforementioned disk which is preferably lead lined, glass lined, or coated is about 10,000 R. P. M., but may vary considerably, say from about 4000 R. P. M. to about 15,000 R. P. M., such speeds being readily attained without difficulty. In the spray drier, as the solution is broken up into small particles by the whirling disk and as it passes down through the rising current of warm air, which may be supplied by waste heat from the roaster or which may be generated by a suitable stove or gas flame or the like, the solution gives up all its water and in addition the solids thereby produced give up their water of crystallization, which is particularly advantageous and important, since crystallization of the aluminum and potassium is prevented and avoided.

In other words, when the solution reaches the bottom floor of the spray drier it is a substantially bone-dry powder containing substantially no water in any form. A suitable exhaust removes the moisture driven off and if desired this exhaust may connect into a common duct with the exhaust of the roaster next to be mentioned. There may be some evolution of sulphur oxides during this operation.

In operating the spray drier it will be understood that the rate or speed of drying depends primarily upon the B. t. u.'s supplied from the drying currents for drying purposes. The greater the available B. t. u. content the more rapid the drying and the smaller may be the drying chamber. A low rate of drying requires a longer drying time and since the material to be dried is falling through space the slower rate of drying requires a greater space through which to fall. The speed of the upward currents affects these factors but too great upward speed promotes eddying or turbulence and in practice all these factors should be suitably correlated in a given installation to get the best results.

By spray drying, as above explained, I eliminate all water from the material either added water or water of crystallization or constitution so that when I next roast this powder, which may be termed an alum, I do not get into the difficulties mentioned above wherein attempts to roast alums resulted in a glassy mass of extreme hardness caused by the melted alum dissolving in its own water of crystallization, as above explained. By the spray drying procedure I directly convert the sulphuric acid solution of the values of the alunite ore, namely, the aluminum and potassium compounds, into an anhydrous powder of aluminum and potassium sulphates thus avoiding the formation of alum crystals with the concomitant disadvantages inherent therein. With a spray dried material I have no such difficulties and accordingly I charge the powder, which may be suitably removed from the spray drier floor, into another rotary kiln where I roast it for about three and one-half hours at about 1800° F.

This rotary kiln may preferably be lined with a heat-resistant low-silica refractory which has been given a coating by melting and fusing some alum containing its water of crystallization until it melts and fuses therein and forms just such a glassy or vitreous lining as has been above mentioned and this lining enters the pores of the brick and adheres thereto in an extremely tight manner forming a most excellent refractory lining preventing contamination of the material being roasted and particularly preventing it from extracting any silica from the refractory itself. Such a lining has a long life and is practically impossible to remove and additionally may be repaired or replaced, when necessary by fusing an additional amount of crystallized alum therein.

In such a lined rotary kiln roasting of the alum is effectively and efficiently carried out. No other lining is at all comparable to the fused alum liner. I am aware of no other liner which gives at all satisfactory results. Glass liners are too frangible and contaminate the powder being roasted by giving up silica thereto. Glass does not prove satisfactory as to the temperatures involved. Low silica brick as a liner contaminates the powder and does not last long enough for efficient economical operations. Cast iron liners have not proved to be satisfactory either. Most metal liners are either attacked by the sulphur oxides given off during the roasting operations or do not well withstand the temperature changes. Scale is formed which contaminates the charge. I am not strictly limited to a roast of three and one-half hours as the time may vary from about such figure to about five hours depending upon conditions and similarly the temperature of the roast may vary from about 800° C. (1472° F.) to about 1,000° C. (1832° F.). During this roast the aluminum sulphate is broken down so that its sulphur is driven off as oxides of sulphur partly as $SO_2$ and partly as $SO_3$, while the potassium sulphate is unaffected by such heat.

As a result, the alum is converted or cracked into a mixture or mass containing water-insoluble alumina and water-soluble potassium sulphate. The sulphur oxides driven off are recovered in any suitable or known manner as sulphuric acid for reuse in the process. Such sulphuric acid may be produced as it is well known by a contact process, lead chamber process or absorption process. The last named is carried out by absorbing $SO_2$ and oxygen in water in the presence of manganese sulphate as a catalyst. Since the proportions of $SO_2$ and $SO_3$ in the exit gases of the roaster vary according to the temperature of roasting—the higher the temperature, the greater the proportion of $SO_2$—the precise recovery process is adapted to the particular circumstances involved in any given installation and to prevent uneconomic losses any combination of such may be used; e. g., first absorption of $SO_3$ and then suitable treatment of $SO_2$.

If I so desire the roasted alum may be conveyed to a storage bin from which it may be removed as needed or it may be directly sent from the roaster to a leaching tank or tanks wherein the roasted alum is leached with hot water at about 212° F. The leaching tank may be of any suitable material, such as wood, lined with lead if desired, and is provided with a suitable agitator so as to expedite the leaching operation and, in addition, the tank may have a bottom which slopes to a lowermost point from which the whole (both liquid and solid) may be drained. I generally find that 15 to 30 minutes is sufficient under the conditions specified for dissolution of all the potash in the hot water leaving the alumina as a solid residue.

In general, I use the practical minimum amount of water necessary to dissolve the $K_2SO_4$ under the conditions of operations. After the potash digestion, I may drain all the materials from the leaching tank and filter the same, the filter cake or residue being alumina and the solution being a potash solution from which the potash may be readily recovered in exceedingly pure form by crystallization by evaporation, either natural evaporation or evaporation forced by the use of steam coils placed therein or by vacuum condensers.

The residue or filter cake, as stated, is alumina. I first wash this alumina, preferably while still on the filter, with an amount of pure water which is substantially equal to one-half the volume of the potash solution. While I am not limited to precisely this amount of water I find it to be a very satisfactory and convenient amount, but, of course, as is well understood in washing operations, I use the least amount of water which will give a reasonably clean residue or filter cake and this wash water is added to the potash solution prior to potash recovery therefrom. Thereafter I may wash the alumina with as much water as I desire to obtain it entirely free from potash and these latter wash waters may be discarded. The alumina is insoluble in water and hence can be freely washed as explained. If the alunite ore contained iron oxides, some or all of these oxides will be present in the alumina. The high grade alunite contains only a trace of iron oxide and this can be ignored for all practical purposes. Some alunite deposits contain a few percentum of iron oxides and hence alumina produced therefrom may contain appreciable amounts thereof. In any case, I may add a little sulphuric acid to one of the wash waters with which the alumina is washed and thus any iron oxide content is removed from the alumina, any traces of sulphuric acid are washed out by additional water.

Finally, I calcine the pure washed alumina above 1000° C. (1832° F.), for example in the neighborhood of 2000° F., and this may also be carried out in a rotary kiln of desired type and has the specific function of rendering the alumina permanently nonhygroscopic.

Thus, from an aluminous ore such as alunite, I recover alumina and potash in exceptionally pure form. It will be understood that pure materials are more valuable than impure materials, but my alumina has the additional value beyond mere purity in that when aluminum is made therefrom, the aluminum is of exceptional purity and has new properties and characteristics as will be understood more fully from my copending application aforementioned. The alumina is preferably converted to aluminum in accordance with my aforesaid copending application or I may use the conventional Hall process.

For example, I find that by the above process I can produce alumina which is 99.75% $Al_2O_3$. Such alumina contains not over about 0.04% $SiO_2$, only that amount of $Fe_2O_3$ which is equivalent to the iron which was present in the original ore, for example 0.21% in one instance, the potash content of the $Al_2O_3$ being nil.

As an example of potash prepared by the present process, I can produce a potash containing 99.73% $K_2SO_4$; 0.24% $Al_2O_3$; a trace of $Fe_2O_3$ and not more than about 0.025% $SiO_2$.

It will be understood that the foregoing is intended more in an illustrative than in a limitative manner and I may make such further variations, modifications, substitutions and omissions within the limits within which such can be controlled without departing from the spirit and scope of the present invention. I may, for example, subject the materials to screening operations at suitable stages with or without preceding rolling or crushing operations. These may occur in preparing the ore for digesting or in preparing the roasted intermediate products for subsequent treatment. The final alumina may also be so treated and may additionally be so crushed and screened as to classify the same in various sizes. Although I find that the various roasting operations may be carried out very satisfactorily in rotary roasters generally mounted in inclined position and suitably revolved as is known per se in the roasting art, I am not restricted thereto but may roast in an ordinary enclosed or muffle furnace preferably with continuous agitation or with intermittent successive raking or turning of the material so that all parts of the material become equally heated without overheating any portions, except that in the final calcining overheating does no harm. Likewise I may eliminate even traces of iron from the alumina by adding a little sulphuric acid to one of the wash waters, the iron being thereby converted from the oxide to the sulphate and becoming dissolved in the acidified wash water.

What I claim as new and desire to secure by Letters Patent is:

1. A process for treating alunite including crushing alunite ore to at least 20 mesh, roasting the same in a rotary kiln for 3½–5 hours at about 842–1292° F., said roast being so carried out as to avoid substantial evolution of oxides of sulphur, digesting the roasted ore with 50° Baumé sulphuric acid of sufficient acid volume to completely satisfy the alumina and potassium content of the roasted ore so as to form aluminum sulphate and potassium sulphate for about 1½ hours at about 212–250° F., separating undigested insoluble ore from the digested ore solution at about 140–230° F., spray drying the ore solution to reduce an anhydrous powder at about 356–437° F., roasting the anhydrous powder for 3½–5 hours at about 1472° F.–1832° F. in a rotary kiln lined with heat-resistant low-silica refractory coated with a lining of melted and fused crystallized alum, leaching out potassium compounds from the roasted powder with water at about 212° F., recovering the insoluble alumina, washing the same, and calcining it to render it non-hygroscopic.

2. In a process of the character described, the step of subjecting a spray dried alunite derivative to a cracking roasting action on a surface pre-coated with crystallized alum melted and fused to a vitreous condition in its own water of crystallization.

3. In a process of the character described, the step of subjecting a spray dried alunite derivative to a cracking roasting action on a surface pre-coated with crystallized alum melted and fused to a vitreous condition in its own water of crystallization at a temperature in the neighborhood of 1800° F. for a period of 3½ to 5 hours.

4. A process for making pure alumina from alunite ore comprising reducing alunite to a suitable state of subdivision, subjecting it to a mild roasting operation, digesting the ore in sulphuric acid to form a sulphuric acid solution of the potassium and aluminum values of the ore, certain portions of the ore such as silica remaining undissolved, separating the solution from the undigested solids, converting the solution directly to dry powder form while avoiding and preventing crystallization which contains potassium and aluminum sulphates, roasting the anhydrous powder in a roaster lined with fused crystalline alum to convert the aluminum sulphate to oxides of sulphur, which pass off as gases, and alumina, the potassium sulphate remaining unaffected, leaching out the potassium sulphate and washing and fixing the residual alumina.

5. A process for treating alunite ore comprising reducing the same to a suitable state of subdivision, roasting it at a temperature which avoids substantial evolution of oxides of sulphur, dissolving in sulphuric acid of suitable strength and amount those portions of the ore soluble in sulphuric acid while simultaneously insuring the sulphate form of the aluminum and potassium compounds, separating the solution from undissolved matter, spray drying the solution to form directly therefrom an anhydrous powder while avoiding any crystal formation and making it possible to destructively roast the powder, roasting the powder in a roaster lined with fused crystalline alum under such conditions that aluminum sulphate is broken down into alumina and oxides of sulphur, the potassium sulphate remaining unaffected, whereby a residue is produced containing water-insoluble alumina and water-soluble potassium sulphate, dissolving the potassium sulphate in water and separating the alumina therefrom, washing the alumina and calcining it.

6. A process for treating alunite ore comprising reducing the same to a suitable state of subdivision, roasting it at a temperature which avoids substantial evolution of oxides of sulphur, dissolving in sulphuric acid of suitable strength and amount those portions of the ore soluble in sulphuric acid while simultaneously insuring the sulphate form of the aluminum and potassium compounds, separating the solution from undissolved matter, spray drying the solution to form directly therefrom an anhydrous powder while avoiding any crystal formation and making it possible to destructively roast the powder, roasting the powder in a roaster lined with fused crystalline alum under such conditions that aluminum sulphate is broken down into alumina and oxides of sulphur, the potassium sulphate remaining unaffected, whereby a residue is produced containing water-insoluble alumina and water-soluble potassium sulphate, dissolving the potassium sulphate in water and separating the alumina therefrom, washing the alumina and calcining it, the alumina being also washed with weak sulphuric acid to remove iron compounds therefrom.

7. In a process of the character described that combination of steps which comprises spray drying a sulphuric acid solution of aluminum and potassium sulphate and destructively roasting the powder produced by the spray drying operations to convert the aluminum sulphate into oxides of sulphur and alumina in a roaster which is lined with fused crystalline alum.

RALPH McC. MOFFAT.